United States Patent [19]

Biricik et al.

[11] 4,164,677

[45] Aug. 14, 1979

[54] ANODE ASSEMBLY FOR HIGH POWER ELECTRON BEAM LASER

[75] Inventors: Vahram W. Biricik, Rancho Palos Verdes; Kang R. Chun, Pacific Palisades; Laurence S. Gresko, Long beach; John S. Barnett, Sepulveda, all of Calif.

[73] Assignee: Northrop Corporation, Los Angeles, Calif.

[21] Appl. No.: 907,989

[22] Filed: May 22, 1978

[51] Int. Cl.² ............................................. H01J 7/26
[52] U.S. Cl. ........................................ 313/35; 228/178
[58] Field of Search ................................... 313/36, 35

[56] References Cited

U.S. PATENT DOCUMENTS

| | | | |
|---|---|---|---|
| 3,440,466 | 4/1969 | Colvin et al. | 313/35 |
| 3,956,712 | 5/1976 | Hant | 331/94.5 PE |
| 3,970,964 | 7/1976 | Olson et al. | 331/94.5 G |
| 4,063,192 | 12/1977 | Bhaumik et al. | 331/94.5 G |

Primary Examiner—Alfred E. Smith
Assistant Examiner—Charles F. Roberts
Attorney, Agent, or Firm—Edward A. Sokolski

[57] ABSTRACT

An anode for an electron beam laser is formed by a thin metallic foil which functions both as a laser cavity wall having an airtight seal, and as a window which permits the passage of electrons therethrough into the laser cavity. This foil anode is supported on a frame structure in a manner such that the foil presents a smooth surface for the laser gas flow and the frame structure provides cooling for the anode to dissipate the heat generated by the electron flow. This frame structure includes a plurality of similar side-by-side, longitudinal, substantially flat, web elements which are separated from each other by gaps through which the electrons can pass. The web elements have cooling tubes welded to each of the opposite edges thereof, one of the tubes being capped with a flat strip which provides a flat surface against which the foil anode can be supported. The web elements are supported at their opposite ends by support blocks which are used to mount these elements in position between the electron gun and the laser cavity, with manifolds being provided in each of the support blocks for feeding cooling fluid to the tubes. The web elements are structurally supported and separated from each other by comb members which extend thereacross between the end blocks. A method is also described for assembling the anode support structure wherein plugs of brazing material are inserted in apertures formed in the web to braze the tubes to the end box and curved sheaths of brazing material are inserted between the tubes, the web and the cap to enable electrical brazing of the parts in a single step.

5 Claims, 7 Drawing Figures

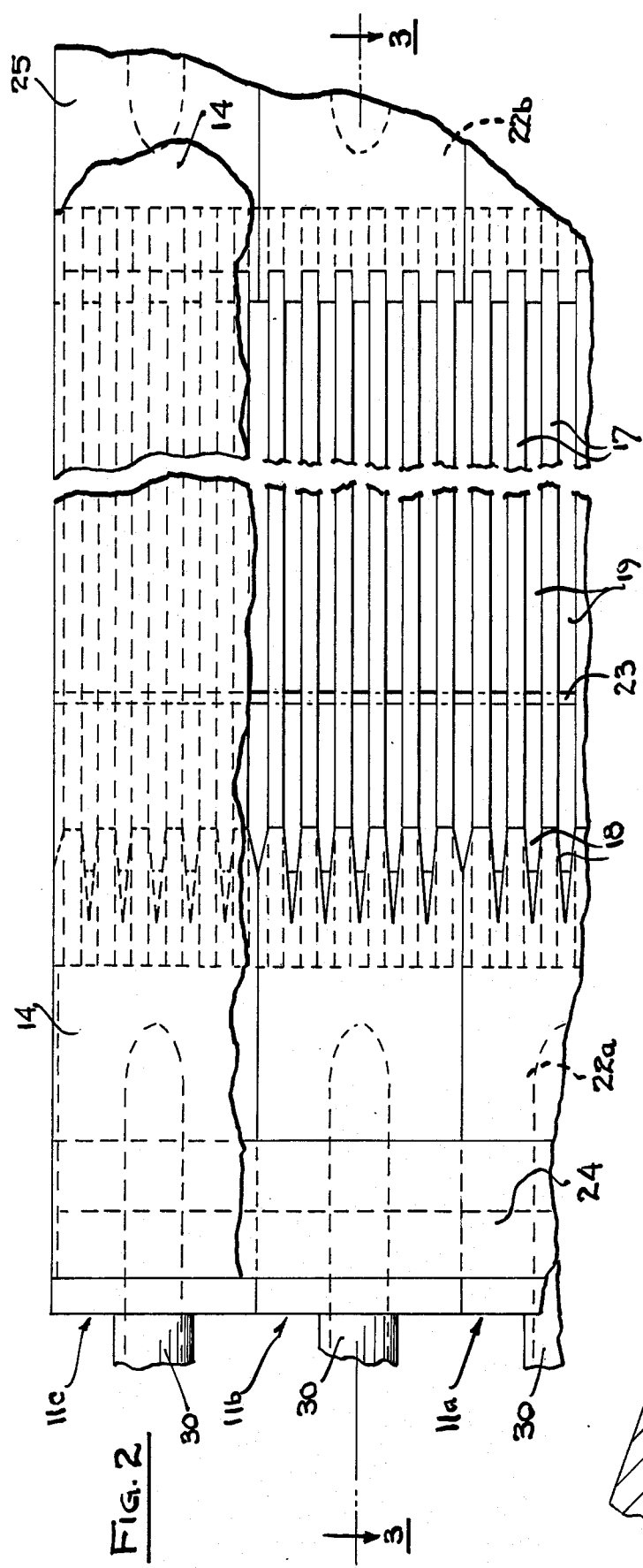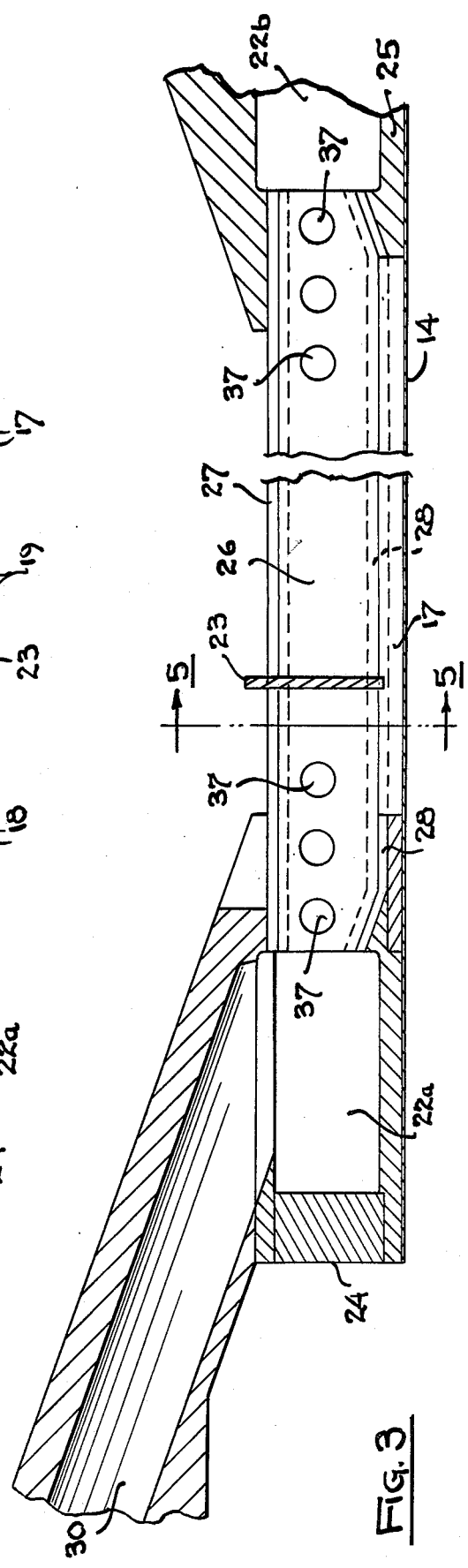
Fig. 2
Fig. 3

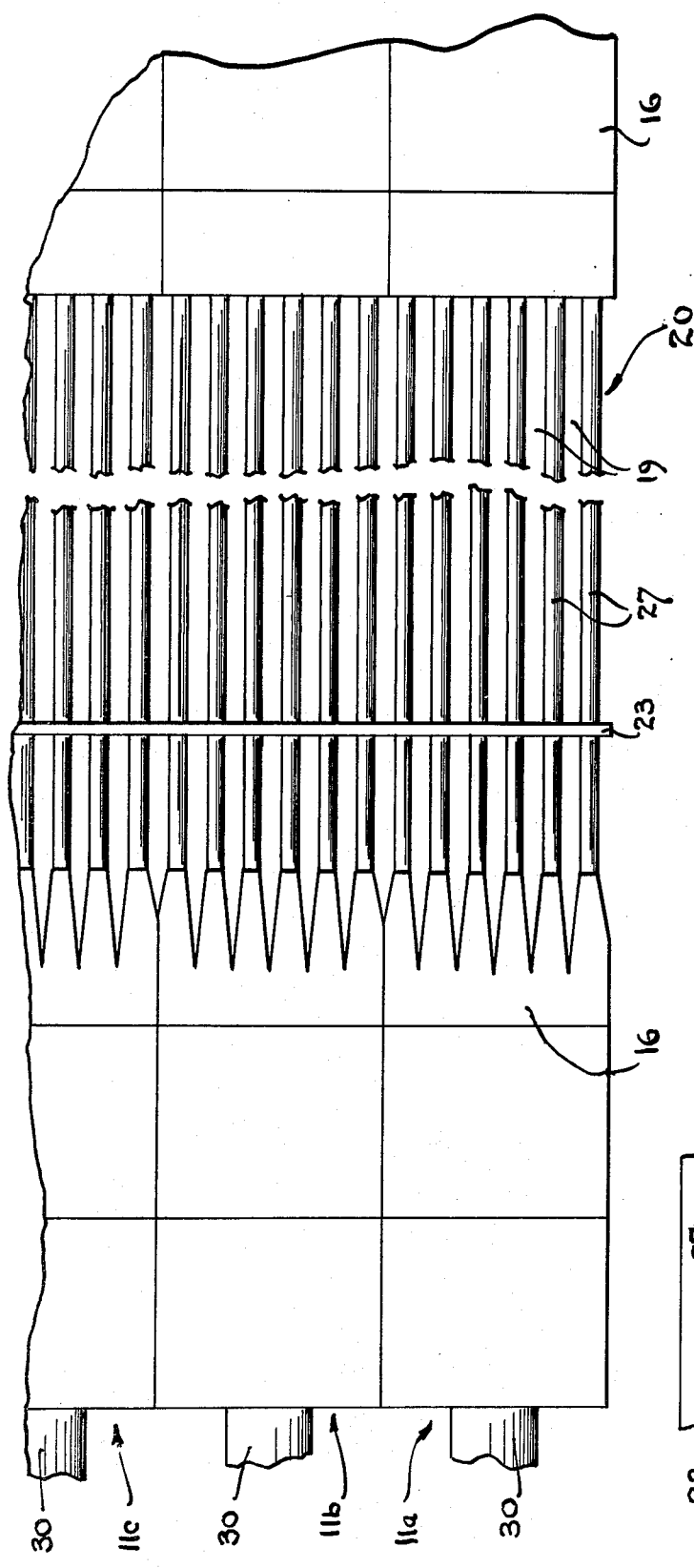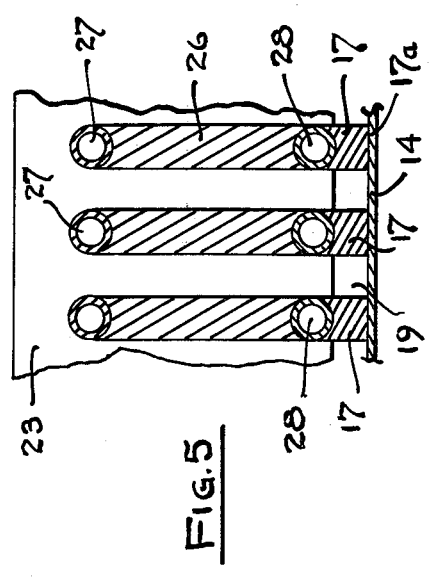

ANODE ASSEMBLY FOR HIGH POWER ELECTRON BEAM LASER

The United States Government has rights in this invention pursuant to Air Force Contract No. F29601-76-C-0006.

This invention relates to electron beam lasers, and more particularly to a support and cooling structure for a foil anode-window for such a laser, and a method for its fabrication.

Electron beam (E-beam) lasers have been developed in recent years to enable high power laser outputs. This type of laser generally employs a beam of electrons generated by an electron gun which is passed through a thin metallic foil window transversely into the laser cavity to pump the gas mixture in the cavity. The anode window must provide a sealed wall for the cavity and, in addition, must have a relatively smooth flat surface so as to avoid interference with the flow of laser gases which are often at supersonic speeds. Further, in view of the high dissipation in the foil engendered by the electron beam, efficient cooling of this foil is required. For background information on area electron guns of the general type contemplated, reference is made to U.S. Pat. No. 3,956,712 issued May 11, 1976 and assigned to Northrop Corporation, assignee of the present invention. High power E-beam lasers employing foil anode windows are described in U.S. Pat. No. 3,970,964 issued July 20, 1976, and U.S. Pat. No. 4,063,192 issued Dec. 13, 1977, both of these patents being assigned to the aforementioned Northrop Corporation. The present invention is directed to a unique support structure for a foil anode window for an E-beam laser, and a method for its assembly, which meets the aforesaid requirements needed for the efficient operation of such an anode. This end result is achieved in the present invention by employing a plurality of side by side web elements having gaps therebetween through which the electron beam can pass, and which have a flat surface against which the anode can be supported so as to present a smooth surface to the laser gas flow which causes minimum impedance to such flow. Further, an efficient cooling system is provided for the anode by means of cooling tubes which run along both of the opposite edges of each of the web elements, these cooling tubes being fed with cooling liquid circulated therethrough from manifolds formed in support plates for the web elements which are located at opposite ends of such web elements.

Further, an efficient technique is disclosed for brazing all of the components of the support structure together in a single step, this end result being achieved by placing plugs of brazing material within apertures formed in the webs and curved foils of brazing material between the tubes and the webs and the tubes and a cap therefor, with the entire assembly being held together in a jig during the brazing operation.

It is therefore an object of this invention to provide an improved support structure for a foil anode for an E-beam laser.

It is a further object of this invention to provide a support structure for a foil anode for an E-beam laser which incorporates an efficient cooling system therein.

Other objects of this invention will become apparent as the description proceeds in connection with the accompanying drawings, of which:

FIG. 2 is a bottom plan view of the preferred embodiment;

FIG. 3 is a cross-sectional view taken along the plane indicated by 3—3 in FIG. 2;

FIG. 4 is a top plan view of the preferred embodiment;

FIG. 5 is a cross-sectional view taken along the plane indicated by 5—5 in FIG. 3;

Briefly described, the device of my invention is as follows: A plurality of web elements are supported at their opposite ends by block support elements, the web elements being arranged in side by side relationship with elongated gaps therebetween. Each web element includes a centrally located elongated web plate which has a cooling tube running along each of the opposite longitudinal edges thereof. A cap member is provided over one of the cooling tubes, this cap member having a flat top surface. The opposite ends of the tubes are connected to manifolds which receive cooling fluid which is circulated through the tubes. The cap surfaces of the web elements are all located in the common plane, the foil anode being bonded to these cap surfaces and stretched smoothly thereover so as to present a smooth wall surface in the laser cavity. A unique method is also described for integrally joining the elements of the support structure together in a single step brazing operation, this end result being implemented by placing plugs of brazing material in apertures formed in the webs and curved strips of brazing material between the tubes and the webs and the tubes and the caps, such that with the entire structure held in a jig, all of the elements can be simultaneously brazed together with the application of brazing current to the assembly.

Figure 1:
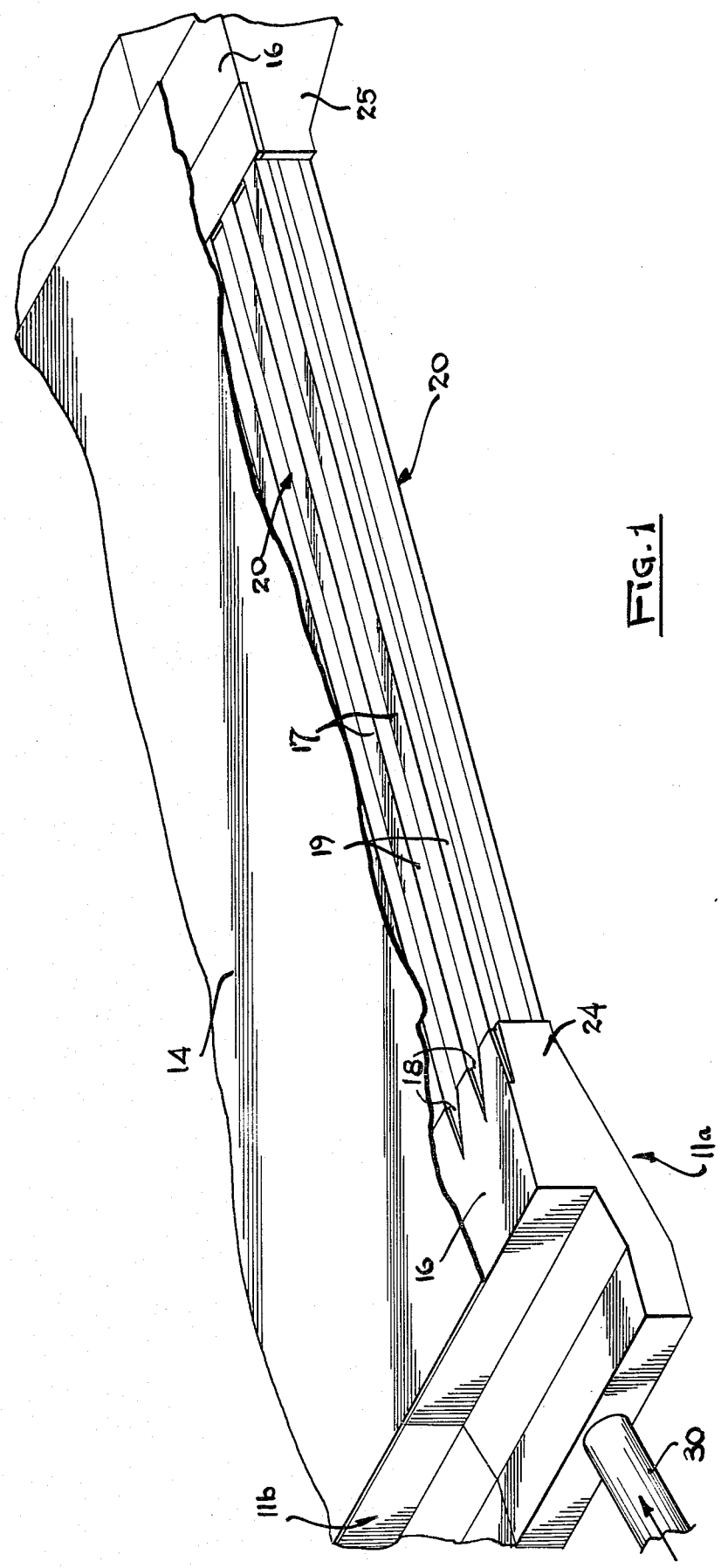
FIG. 1 is a perspective view showing a preferred embodiment of the invention.

Referring now to FIGS. 1-5, a preferred embodiment of the anode assembly of the invention is illustrated. This can best be seen in FIGS. 1, 2 and 4. The assembly comprises a plurality of similar units 11a, 11b, 11c, etc., these units being arranged in side by side relationship and supporting a foil anode 14, as shown in FIGS. 1 and 2. The foil anode 14 which may be of aluminum has a thickness of the order of 0.0015 inches and is stretched over the web assembly units 11a-11b, 11c, and in the stretched condition is bonded to the top surfaces of fairing plates 16 and the cap strips 17 of the web elements with a suitable bonding material such as, for example, an epoxy resin. Thus, the vacuum space on one side of window foil 14 is sealed from the laser space on the other side thereof.

In a typical assembly, there would be about 20 web assembly units 11a, 11b, 11c., etc. The web assembly units are each formed from a plurality of web elements 20 which are joined together at their end portions to block support elements 24 and 25, and are arranged in parallel spaced relationship. The web elements 20 are braced crosswise by means of two slotted combs 23 (only one shown).

The upstream end (from where the laser gases will be coming across the foil) of fairing plate 16 is formed with V-shaped slots 18. These slots operate to minimize gas density disturbances where the vacuum first contacts the foil on the side from which the supersonic laser flow is coming. The use of such "V" slots prevents the formation of shock waves, which could be caused by the supersonic flow across a straight edge at the upstream side of the openings of the spaces 19 between the web elements.

Referring now particularly to FIGS. 3 and 5, each of the web elements comprises a central web plate 26 which may be of copper clad stainless steel, with an upper and lower copper coolant tube 27 and 28 respectively brazed to the upper and lower edges thereof. Brazed to the edges of each of the lower coolant tubes 28 are cap members 17 having flat surfaces 17a to which the foil anode 14 is bonded. Coolant tubes 27 and 28 run between manifolds 22a and 22b. Cooling liquid is fed to manifold 22a through pipe 30 and outletted from manifold 22b by a similar pipe (not shown), thus providing a circulation of cooling fluid to the cooling tubes 27 and 28.

Thus, as can be seen, the web plates 26 provide heat sinks for foil anode 14, these heat sinks being efficiently cooled with cooling fluid circulated through tubes 27 and 28. The web elements at the same time provide a firm support structure for the foil anode which maintains the anode in a flat posture so that it presents minimum resistance to the supersonic laser gas flow in the laser cavity.

Figure 6:
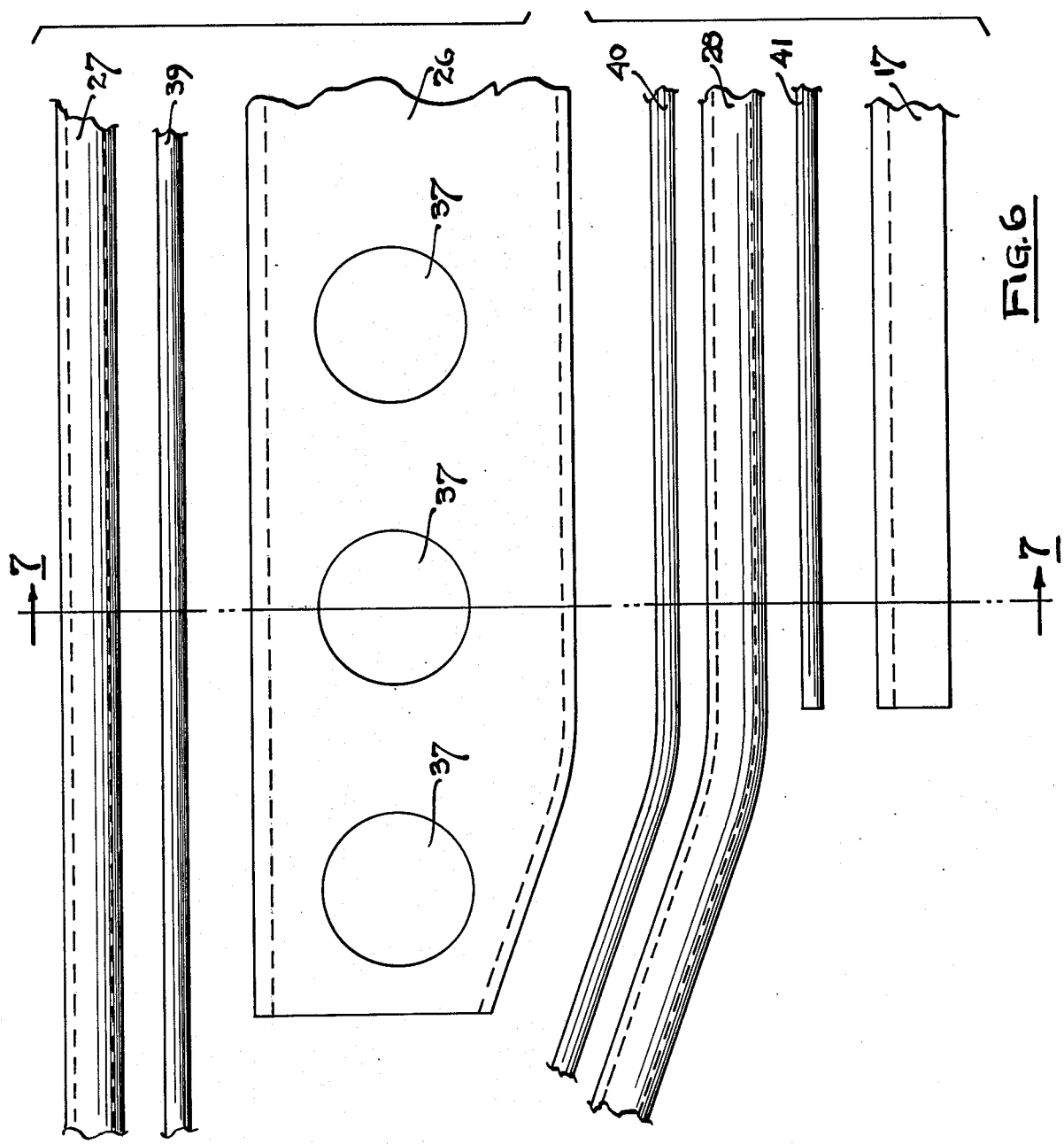
FIG. 6 is an exploded view illustrating the method of assembling the device of the invention.
Figure 7:
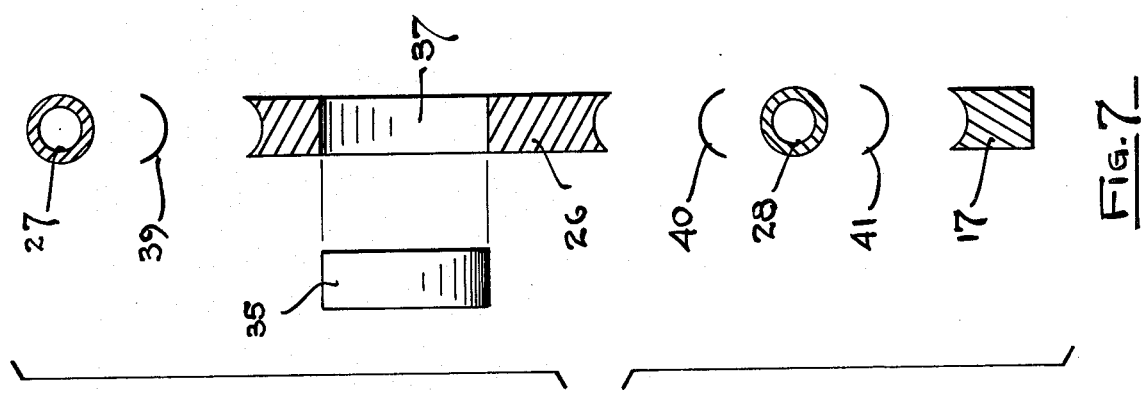
FIG. 7 is a cross-sectional view taken along the plane indicated by 7—7 in FIG. 6.

Referring now to FIGS. 6 and 7, the method of fabricating the web elements in a unitary step is illustrated. To accomplish this end result successfully, uniform pressure must be exerted on all modular parts by means of a brazing fixture and sufficient brazing material must be provided at all joints. A mixture of nickel and gold is used as the brazing material. A thin disc 35 of brazing material is first fitted into each of holes 37. This brazing material will melt during brazing and seal the joints between the side of web plates 26 and the manifold. A thin curved strip of brazing material 39, 40 and 41, is placed between tube 27 and web plate 26, web plate 26 and tube 28, and tube 28 and cap 17, respectively. Also, a pair of copper combs 23 are placed in position over and between the web plates. When the brazing foils are melted during brazing, the various components are brazed together.

Various elements shown in FIGS. 6 and 7 in the order shown in these figures are placed in an alignment fixture (not shown) and tightly clamped together and the block support units 24 and 25 placed in proper position at the ends of a plurality of such units and held in position to form a module unit. The web module held in the brazing fixture is placed in a brazing furnace and vacuum brazed, wherein it is welded together in a single step.

While the invention has been described and illustrated in detail, it is to be clearly understood that this is intended by way of illustration and example only and is not to be taken by way of limitation, the spirit and scope of this invention being limited only by the terms of the following claims.

We claim:

1. An anode assembly for an electron beam laser comprising:
   a. a plurality of elongated web elements arranged in side by side relationship, there being elongated gaps therebetween,
   b. a block support element attached to each of the opposite ends of the web elements to join said web elements together into an integral unit,
   c. each of said web elements including a centrally located elongated web plate, a cooling tube running along each of the opposite longitudinal edges of the web plate, and a cap member running along the edge of one of said cooling tubes, said cap member having a flat outer surface,
   d. each of said block support elements having a manifold formed therein, the cooling tubes running between the manifolds of said block support elements,
   e. means for circulating cooling fluid through said manifolds and said cooling tubes, and
   f. a metal foil forming the anode bonded to the block support elements and the caps of said web elements in flat abutment thereagainst.

2. The assembly of claim 1 wherein one of said block support elements has V-shaped slots formed therein over which the anode foil is mounted for preventing shock waves and turbulence in the flowing laser gas.

3. The anode assembly of claim 1 wherein the web plates of the web elements are flat.

4. The assembly of claim 1 wherein the web elements are arranged in parallel relationship.

5. The anode assembly of claim 1 further including a comb member having its teeth placed between the web elements thereby structurally bracing the web elements.

* * * * *